(12) United States Patent
Tachiiri

(10) Patent No.: US 9,791,931 B2
(45) Date of Patent: Oct. 17, 2017

(54) OPERATION DEVICE

(71) Applicant: DENSO CORPORATION, Kariya, Aichi-pref. (JP)

(72) Inventor: Motoki Tachiiri, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/787,479

(22) PCT Filed: Apr. 21, 2014

(86) PCT No.: PCT/JP2014/002225
§ 371 (c)(1),
(2) Date: Oct. 28, 2015

(87) PCT Pub. No.: WO2014/181505
PCT Pub. Date: Nov. 13, 2014

(65) Prior Publication Data
US 2016/0077590 A1    Mar. 17, 2016

(30) Foreign Application Priority Data

May 7, 2013   (JP) ................. 2013-097853

(51) Int. Cl.
*G06F 3/01*     (2006.01)
*H01F 27/28*    (2006.01)
(Continued)

(52) U.S. Cl.
CPC .............. *G06F 3/016* (2013.01); *G06F 3/038* (2013.01); *G06F 3/0354* (2013.01); *H01F 27/24* (2013.01);
(Continued)

(58) Field of Classification Search
None
See application file for complete search history.

(56) References Cited

U.S. PATENT DOCUMENTS 5,808,381 A    9/1998   Aoyama et al.
6,747,631 B1   6/2004   Sakamaki et al.
(Continued)

FOREIGN PATENT DOCUMENTS

JP    H08107665 A    4/1996
JP    2000330688 A   11/2000
(Continued)

OTHER PUBLICATIONS

International Search Report and Written Opinion (in Japanese with English Translation) for PCT/JP2014/002225, mailed Jun. 24, 2014; ISA/JP.
(Continued)

*Primary Examiner* — Alexander Eisen
*Assistant Examiner* — Kebede Teshome
(74) *Attorney, Agent, or Firm* — Harness, Dickey & Pierce, P.L.C.

(57) ABSTRACT

An operation device includes: a magnet; a coil; an operation unit; a holding body; a mobile body; and a coil-side yoke. The holding body holds the coil. The mobile body holds the magnet so as to provide a predetermined clearance between the coil and the magnet. The mobile body is in contact with the holding body and movable relatively with respect to the holding body due to the operation force input into the operation unit. The coil-side yoke is disposed on the coil opposite to the magnet so as to lead the magnetic line generated by the magnet to the coil. The coil-side yoke is held by the mobile body so as to be movable with the magnet.

4 Claims, 5 Drawing Sheets

(51) Int. Cl.
*G06F 3/0354* (2013.01)
*H02K 41/035* (2006.01)
*G06F 3/038* (2013.01)
*H01F 27/24* (2006.01)

(52) U.S. Cl.
CPC ..... *H01F 27/2823* (2013.01); *H02K 41/0356* (2013.01)

(56) References Cited

U.S. PATENT DOCUMENTS

2004/0056745 A1* 3/2004 Watanabe ............... G06F 3/016
 335/220
2004/0059245 A1 3/2004 Watanabe et al.
2004/0252104 A1 12/2004 Nakamura et al.
2009/0160588 A1* 6/2009 Yano ................... H01F 7/1615
 335/174

FOREIGN PATENT DOCUMENTS

| JP | 2003189579 A | 7/2003 |
| JP | 2005004365 A | 1/2005 |
| JP | 2006036019 A | 2/2006 |
| JP | 3997872 B2 | 10/2007 |
| WO | WO-2014174793 A1 | 10/2014 |

OTHER PUBLICATIONS

U.S. Appl. No. 14/784,428, filed Oct. 14, 2015, Hisatsugu.

* cited by examiner

OPERATION DEVICE

CROSS REFERENCE TO RELATED APPLICATIONS

This application is a U.S. National Phase Application under 35 U.S.C. 371 of International Application No. PCT/JP2014/002225 filed on Apr. 21, 2014 and published in Japanese as WO 2014/181505 A1 on Nov. 13, 2014. This application is based on and claims the benefit of priority from Japanese Patent Application No. 2013-097853 filed on May 7, 2013. The entire disclosures of all of the above applications are incorporated herein by reference.

TECHNICAL FIELD

The present disclosure relates to an operation device in which an operation force is input.

BACKGROUND ART

Patent literature 1 discloses an operation device configured to enable an operator to feel a reaction force of operation by conferring an actuating force generated in an actuator to an operation unit in which to input an operation force. The actuator has coils held by a holding body and magnets held by a mobile body. Upon input of an operation force to the operation unit, the mobile body in contact with the holding body moves relatively with respect to the holding body while maintaining the coils and the magnets spaced apart by a constant distance. An electromagnetic force generated when a current is passed through the coils is exerted on the operation unit as the actuating force. The coils and the magnets are disposed between two yoke plates forming a magnetic circuit and the yoke plates are held by the holding body.

PRIOR ART LITERATURES

Patent Literature

Patent Literature 1: JP-3997872 B

SUMMARY OF INVENTION

Object to be Solved

In the operation device of Patent literature 1, the magnets are held by the holding body and the coils are held by the mobile body as described above. In contrast, the inventor of the present disclosure conducted a study on an operation device configured in such a manner that the coils are held by the holding body and the magnets are held by the mobile body.

According to the study, a magnetic attraction force acting between the yoke plates and the magnets is exerted over the holding body and the mobile body because the magnets are held by the mobile body while the yoke plates are held by the holding body. In short, the mobile body is pressed against the holding body by the magnetic attraction force. Hence, a large frictional force is generated between the mobile body and the holding body when the mobile body in contact with the holding body moves relatively with respect to the holding body. An operation feeling when an operator operates the operation unit is thus deteriorated. Moreover, because the magnetic attraction force varies with a current-carrying state of the coils, the frictional force varies, too. The operation feeling is thus further deteriorated.

It is an object of the present disclosure to provide an operation device configured to enhance an operation feeling.

Means for Solving Object

According to an aspect of the present disclosure, an operation device includes: a magnet; a coil; an operation unit; a holding body; a mobile body; and a coil-side yoke. The coil is disposed at a position, through which a magnetic line generated from the magnet passes. The operation unit, on which an electromagnetic force functions as a reaction force, the electromagnetic force being generated when an operation force is input and the coil is energized. The holding body holds the coil. The mobile body is in contact with the holding body and movable relatively with respect to the holding body due to the operation force input into the operation unit while holding the magnet so as to provide a predetermined clearance between the coil and the magnet. The coil-side yoke is disposed on the coil opposite to the magnet so as to lead the magnetic line generated by the magnet to the coil. The coil-side yoke is held by the mobile body so as to be movable with the magnet.

In the operation device configured as above, the coil-side yoke is disposed to the coil on the opposite side of the magnet. In short, the coil is disposed between the coil-side yoke and the magnet. Nevertheless, the coil-side yoke is held by the mobile body so as to move with the magnet. Hence, the configuration as above can avoid an inconvenience that a magnetic attraction force acting between the coil-side yoke and the magnet is exerted over the holding body and the mobile body. In short, an inconvenience that the mobile body is pressed against the holding body by the magnetic attraction force can be avoided. Hence, the configuration as above can avoid an inconvenience that a large frictional force is generated between the mobile body and the holding body when the mobile body in contact with the holding body moves relatively with respect to the holding body. Consequently, an operation feeling when an operator operates the operation portion is enhanced.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
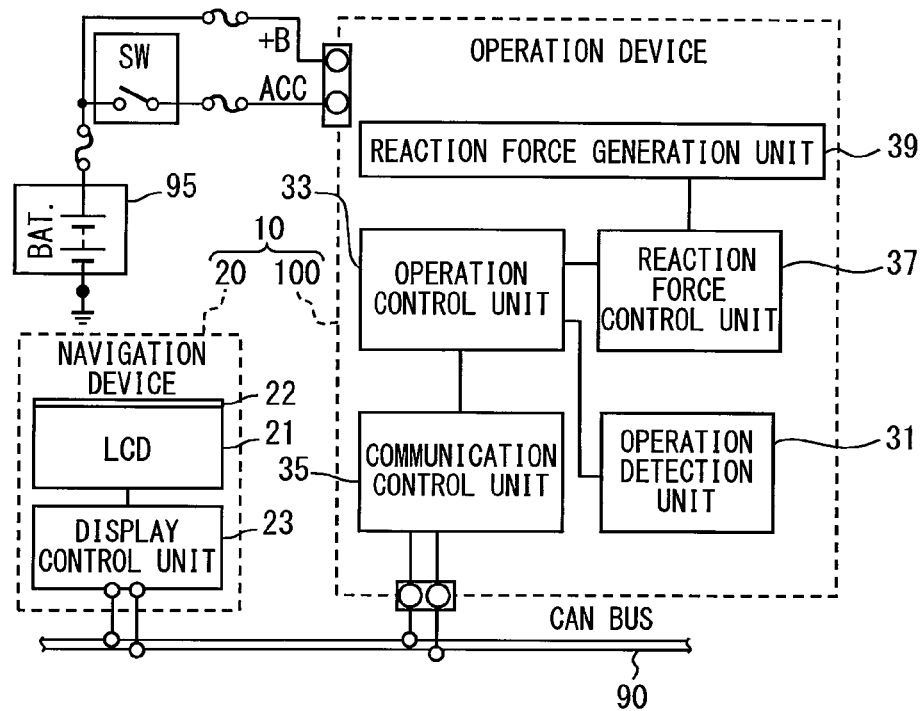
FIG. 1 is a view used to describe a configuration of a display system provided with an operation device according to a first embodiment of the present disclosure.
Figure 2:
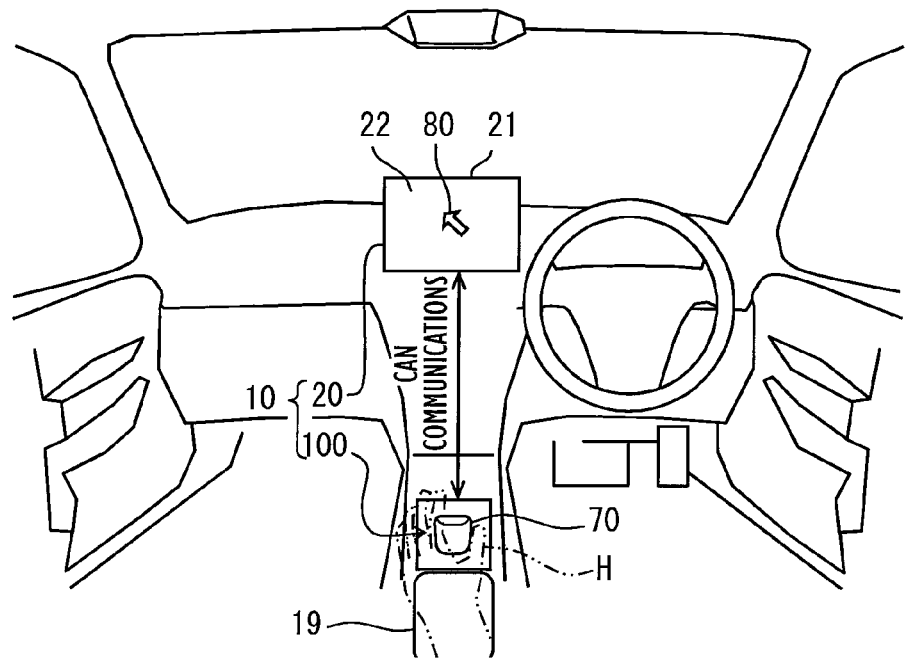
FIG. 2 is a view used to describe a layout of the operation device of the first embodiment in a vehicle interior.

An operation device 100 of the present embodiment is mounted to a vehicle and, as is shown in FIG. 1, forms a display system 10 together with a navigation device 20 and so on. As is shown in FIG. 2, the operation device 100 is disposed to a vehicle center console at a position next to a palm rest 19, and an operation knob 70 is exposed in a range easy to reach for a hand H of an operator. Upon input of an operation force by the hand H of the operator or the like, the operation knob 70 undergoes displacement in a direction of the input operation force. The navigation device 20 is disposed within a vehicle instrument panel and a display screen 22 is exposed toward a driver's seat. The display screen 22 displays multiple icons correlated with respective predetermined functions, a pointer 80 used to choose an arbitrary icon, and so on. Upon input of a horizontal operation force to the operation knob 70, the pointer 80 moves on the display screen 22 in a direction corresponding to the input direction of the operation force.

A configuration of each of the operation device 100 and the navigation device 20 will be described in detail.

As are shown in FIGS. 1 and 2, the navigation device 20 has a display control unit 23 that draws an image to be displayed on the display screen 22 and a liquid crystal display 21 that continuously displays images drawn by the display control unit 23 on the display screen 22.

As is shown in FIG. 1, the operation device 100 is connected to a CAN (Controller Area Network) bus 90, an outside battery 95, and so on. The CAN bus 90 is a transmission path in an in-vehicle communication network constituted by interconnecting multiple in-vehicle devices mounted to the vehicle and used to transmit data among the respective in-vehicle devices. The operation device 100 is capable of making CAN communications with the navigation device 20 located at a distance via the CAN bus 90. In other words, the navigation device 20 is remotely operated by the operation device 100 disposed close at hand near the operator.

The operation device 100 is electrically formed of a communication control unit 35, an operation detection unit 31, a reaction force generation unit 39, a reaction force control unit 37, an operation control unit 33, and so on. Power necessary for operations of the respective components is supplied from the battery 95.

The communication control unit 35 outputs information processed in the operation control unit 33 to the CAN bus 90. The communication control unit 35 also acquires information outputted to the CAN bus 90 from other in-vehicle devices and outputs the acquired information to the operation control unit 33. The operation detection unit 31 detects a position of the operation knob 70 moved by an input of the operation force. The operation detection unit 31 outputs operation information indicating the detected position of the operation knob 70 to the operation control unit 33.

The reaction force generation unit 39 is an actuator, such as a voice coil motor, and configured so as to generate a reaction force of operation in the operation knob 70. For example, when the operator puts the pointer 80 on an icon on the display screen 22, the reaction force generation unit 39 applies a reaction force of operation to the operation knob 70 for the operator to feel as if he sensed a tactile response from the icon. The reaction force control unit 37 is formed of, for example, a microcomputer to perform various computations. The reaction force control unit 37 controls a direction and intensity of a reaction force of operation applied from the reaction force generation unit 39 to the operation knob 70 according to reaction information acquired from the operation control unit 33.

The operation control unit 33 is formed of, for example, a microcomputer to perform various computations. The operation control unit 33 acquires operation information detected by the operation detection unit 31 and outputs the acquired operation information to the CAN bus 90 via the communication control unit 35. The operation control unit 33 also computes a direction and intensity of a reaction force of operation to be applied to the operation knob 70 and outputs the computation result to the reaction force control unit 37 as the reaction force information.

Figure 3:
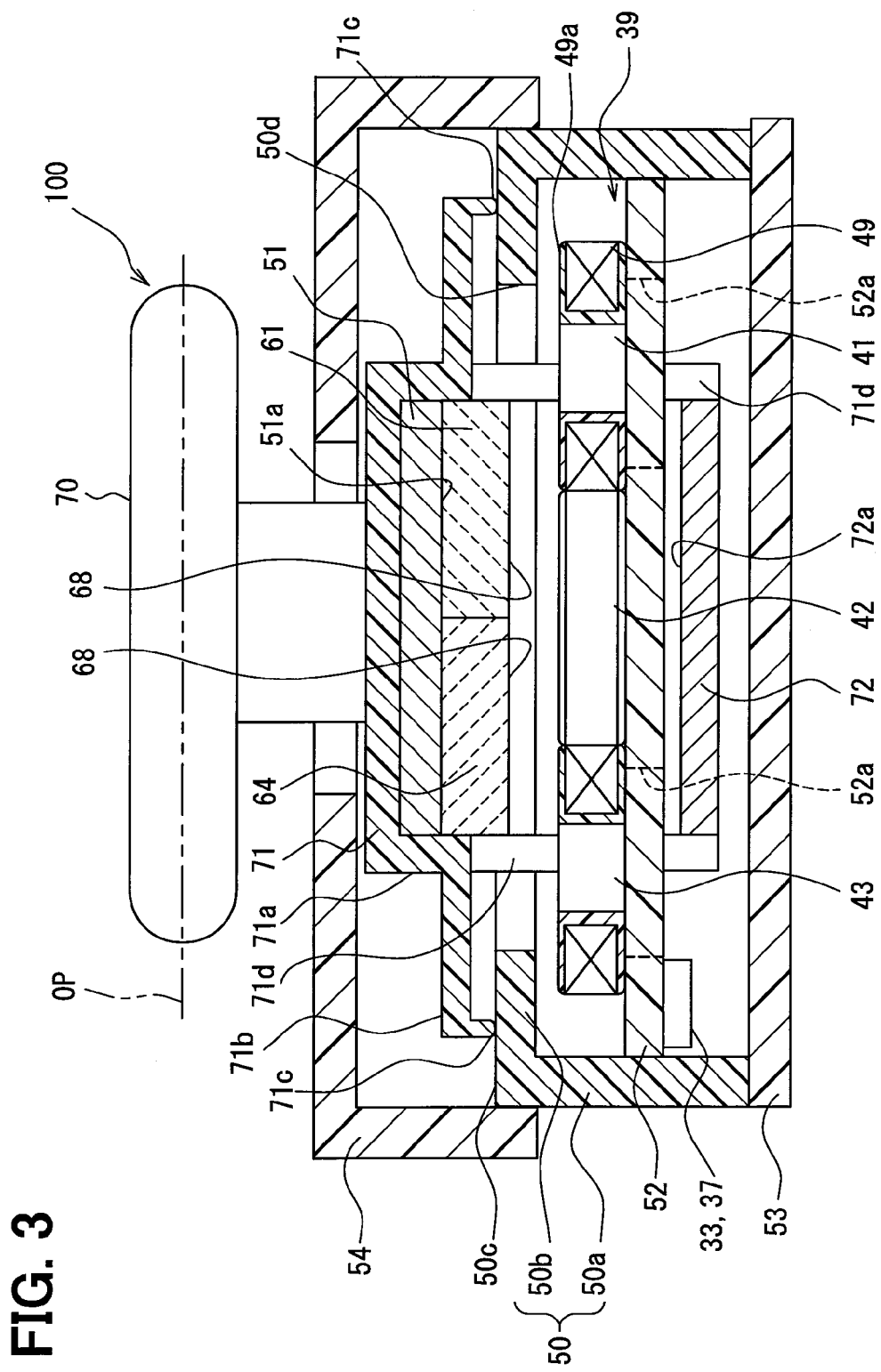
FIG. 3 is a sectional view of the operation device of the first embodiment.

As is shown in FIG. 3, the operation device 100 is mechanically formed of the operation knob 70 described above as well as a housing 50 and the like.

The operation knob 70 is provided in a manner relatively movable with respect to the housing 50 in an x-axis direction and a y-axis direction along a virtual operation plane OP. A movable range in the x-axis direction and the y-axis direction of the operation knob 70 is preliminarily determined by the housing 50. When freed from the applied operation force, the operation knob 70 returns to a reference position as a benchmark.

The housing 50 is a casing that stores respective components, such as a circuit board 52, while supporting the operation knob 70 in a relatively movable manner. The circuit board 52 is fixed inside the housing 50 in a posture in which a board surface direction is aligned with the operation plane OP. Microcomputers forming the operation control unit 33, the reaction force control unit 37, and the like are mounted to the circuit board 52.

A configuration of the reaction generation unit 39 in the operation device 100 will now be described further according to FIGS. 3 through 5.

The reaction force generation unit 39 is formed of four coils 41 through 44, four magnets 61 through 64, a magnet-side yoke 51, a coil-side yoke 72, and so on. Each of the coils 41 through 44 uses a wire made of a non-magnetic material, such as copper, as a winding wire 49, and formed by winding the winding wire 49 around a bobbin 49a. Currents applied to the respective winding wires 49 are controlled by the reaction force control unit 37 individually for each winding wire 49.

The respective coils 41 through 44 are mounted to the circuit board 52 in a posture in which a winding axial direction of the winding wire 49 is aligned with a z-axis orthogonal to the operation plane OP. The respective coils 41 through 44 are held by the circuit board 52 in an orientation in which the winding wires 49 extend along the x-axis direction and also along the y-axis direction.

The four coils 41 through 44 are disposed in the shape of a cross. More specifically, the coils 41 and 43 in one set are aligned in the x-axis direction at an interval and the coils 42 and 44 in another set are aligned in the y-axis direction at an interval. A center region 45 surrounded by the four coils 41 through 44 on all four sides is thus formed (see FIG. 4).

The respective magnets 61 through 64 are neodymium magnets or the like and shaped like a plate. The respective magnets 61 through 64 are of a quadrilateral shape having sides 69 of equal length (see FIG. 4). In the present embodiment, the respective magnets 61 through 64 are formed in substantially a square shape. The respective magnets 61 through 64 are held by a knob base 71 in a posture in which orientations of the respective sides 69 are aligned with the x-axis or the y-axis.

The four magnets 61 through 64 are lined two by two in the x-axis direction and the y-axis direction. Each of the four magnets 61 through 64 has a counter surface 68 (see FIG. 3) that faces toward the circuit board 52 while each is held by the knob base 71. The respective counter surfaces 68 of the four magnets 61 through 64 are smooth planes of substantially a square shape. Each counter surface 68 opposes two coils out of the four coils 41 through 44 in the z-axis direction.

Each of the magnets 61 through 64 is magnetized in the z-axis direction. The counter surface 68 and the opposite surface of one magnet have different polarities. Regarding the polarities of the counter surfaces 68 of the respective magnets 61 through 64, two polarities, namely, an N pole and an S pole, alternate in the magnets adjacent to each other in the x-axis direction and the y-axis direction.

The magnet-side yoke 51 and the coil-side yoke 72 are made of a magnetic material and shaped like a rectangular plate. More specifically, the yokes 51 and 72 are shaped like a flat plate having no irregularities. The magnet-side yoke 51 is disposed to the magnets 61 through 64 on the side of the operation knob 70 while the coil-side yoke 72 is disposed to the coils 41 through 44 on the opposite side of the operation knob 70. In other words, the reaction force generation unit 39 is formed in such a manner that the magnets 61 through 64 and the coils 41 through 44 are positioned between the both yokes 51 and 72.

The magnet-side yoke 51 and the coil-side yoke 72 form a part of a magnetic circuit that serves as a path of magnetic lines generated from the magnets 61 through 64. Hence, the magnetic lines leaking to the outside of the magnetic circuit are reduced. In other words, the coils 41 through 44 are disposed at a position at which the magnetic lines pass through between the both yokes 51 and 72, by which the magnetic lines are concentrated to the coils 41 through 44.

Mutually opposing counter surfaces 72a and 51a of the coil-side yoke 72 and the magnet-side yoke 51, respectively, are of a same shape and a same size. The counter surfaces 72a and 51a are disposed in such a manner that outer shapes coincide with each other when viewed in the z-axis direction. In a case where a single object made up of the four magnets 61 through 64 is called a combination magnet, the size of the counter surfaces 72a and 51a is set so as to prevent the combination magnet from protruding from the counter surfaces 72a and 51a when viewed in the z-axis direction. More specifically, a length of one side of the counter surfaces 72a and 51a of a rectangular shape is set equal to or longer than lengths Lmx and Lmy between outer edges of the combination magnet (see FIG. 4). In the example shown in FIG. 3, a length of one side of the counter surfaces 72a and 51a is equal to the lengths Lmx and Lmy between the outer edges of the combination magnet.

The housing 50 has a main body unit 50a that stores the four coils 41 through 44, the coil-side yoke 72, and the circuit board 52 inside and a support unit 50b that supports the knob base 71. The main body unit 50a is shaped like a cylinder extending in the z-axis direction and the supporting unit 50b is shaped like a plate extending to an inner side of the cylinder from a cylinder end of the main body unit 50a on the side of the operation knob 70. The main body unit 50a and the support unit 50b are made of resin and formed into one piece.

The circuit board 52 is fixed to the main body unit 50a and the coils 41 through 44 are mounted to the circuit board 52.

Hence, it can be said that the coils 41 through 44 are held by the main body unit 50a via the circuit board 52. In short, the housing 50 and the circuit board 52 function as "a holding body" to hold the coils 41 through 44.

A bottom lid 53 is attached to the main body unit 50a at a cylinder end on the opposite side of the operation knob 70. A cover 54 covering the knob base 71 is attached to the main body unit 50a at the cylinder end on the side of the operation knob 70. Hence, the housing 50, the bottom lid 53, the cover 54, and the circuit board 52 are fixed within the instrument panel at the respective predetermined positions and inhibited from undergoing displacement.

In contrast, the knob base 71 is held by the housing 50 and allowed to move inside the cover 54. The knob base 71 holds the four magnets 61 through 64, the magnet-side yoke 51, and the coil-side yoke 72. Further, the operation knob 70 is attached to the knob base 71. Hence, upon input of an operation force to the operation knob 70, the knob base 71, the magnets 61 through 64, and the both yokes 51 and 72 move together with the operation knob 70 as a single unit. In short, the knob base 71 functions as "a mobile body" that is in contact with the housing 50 and moves relatively with respect to the housing 50 while holding the magnets 61 through 64 and so on. The operation knob 70 functions as "an operation unit" in which to input an operation force from the operator.

The knob base 71 has a holding unit 71a, an extension unit 71b, an abutting unit 71c, and a bracket 71d, all of which will be described in the following. The holding unit 71a is shaped like a cylinder to hold the magnet-side yoke 51 and the magnets 61 through 64 inside. The extension unit 71b is shaped like a plate extending parallel to the operation plane OP from a cylinder end of the holding unit 71a. The abutting unit 71c is shaped like a pin protruding toward the housing 50 from an extension end of the extension unit 71b. The abutting unit 71c is provided to at least three points in the extension unit 71b. In the example shown in FIG. 3, the abutting unit 71c is provided to each of four corners of the extension unit 71b of a rectangular shape.

The support unit 50b of the housing 50 forms a sliding-contact surface 50c expanding parallel to the operation plane OP. The multiple abutting units 71c described above abut on the sliding-contact surface 50c. Owing to the abutment thus made, the knob base 71 is supported on the housing 50 in a manner movable in a direction of the operation plane OP.

The bracket 71d is of a shape extending in the z-axis direction along the outer edges of the combination magnet. In the example of FIG. 4, the bracket 71d is provided to each of four corners of the combination magnet. The brackets 71d are disposed so as to penetrate through openings 50d and 52a provided to the housing 50 and the circuit board 52, respectively. The coil-side yoke 72 is attached to the tip ends of the brackets 71d. The coil-side yoke 72 is disposed to the circuit board 52 on the opposite side of the respective coils 41 through 44.

The holding unit 71a, the extension unit 71b, and the abutting units 71c are molded from resin and formed into one piece. The brackets 71d are made of a non-magnetic material, such as resin, and attached to the extension unit 71b.

The following will describe the principle under which the reaction force generation unit 39 configured as above generates a reaction force of operation to be applied to the operation knob 70.

Figure 4:
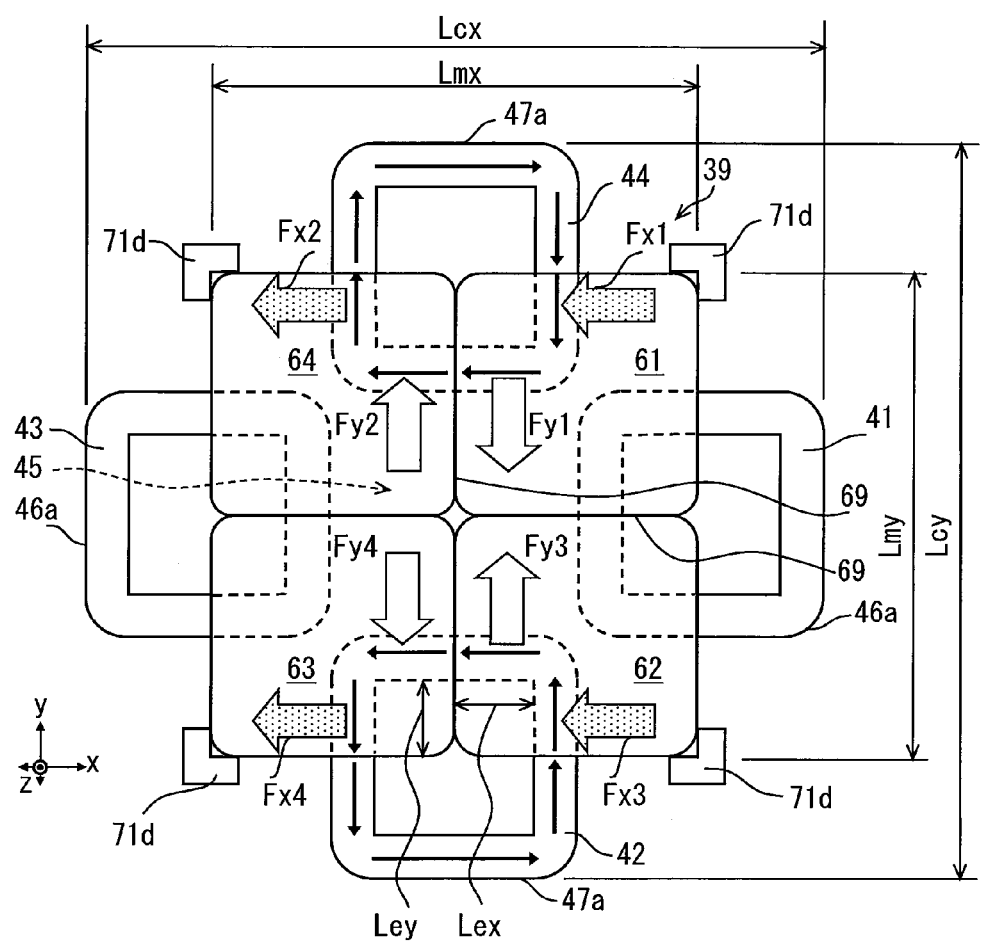
FIG. 4 is a view schematically showing a positional relation of coils, magnets, and brackets when a reaction force generation unit of the first embodiment is viewed in a z direction.

Firstly, a description will be given to a case where a reaction force of operation in the x-axis direction is generated when the combination magnet together with the operation knob 70 is returned to the reference position as shown in FIG. 4. Herein, currents are applied to the respective coils 42 and 44 aligned in the y-axis direction by the reaction force control unit 37. When viewed in a top view in a direction from the coil-side yoke 72 to the magnet-side yoke 51, a clockwise current flows in the coil 44. On the contrary, a counter-clockwise current, which is an opposite direction of the direction in the coil 44, flows in the coil 42.

Owing to the currents as above, an electromagnetic force Fy1 in a direction from the coil 44 to the coil 42 along the y-axis (hereinafter, referred to as the backward direction) is generated from the winding wire 49 of the coil 44 in a portion extending in the x-axis direction and superimposing on the magnet 61 in the z-axis direction. Also, an electromagnetic force Fy2 in a direction from the coil 42 to the coil 44 along the y-axis (hereinafter, referred to as the forward direction) is generated from the winding wire 49 of the coil 44 in a portion extending in the x-axis direction and superimposing on the magnet 64 in the z-axis direction. Likewise, an electromagnetic force Fy3 in the forward direction and the electromagnetic force Fy4 in the backward direction are generated from the winding wire 49 of the coil 42 in portions extending in the x-axis direction and superimposing, respectively, on the magnets 62 and 63 in the z-axis direction. The electromagnetic forces Fy1 and Fy3 also the electromagnetic forces Fy2 and Fy4 in the y-axis direction cancel out each other.

On the other hand, electromagnetic forces Fx1 and Fx2 in a direction from the coil 41 to the coil 43 along the x-axis direction (hereinafter, referred to as the leftward direction) are generated from the winding wire 49 of the coil 44 in portions extending in the y-axis direction and superimposing, respectively, on the magnets 61 and 64 in the z-axis direction. Likewise, electromagnetic force Fx3 and Fx4 in the leftward direction are generated from the winding wire 49 of the coil 42 in portions extending in the y-axis direction and superimposing, respectively, on the magnets 62 and 63 in the z-axis direction. The reaction force generation unit 39 is capable of having the electromagnetic forces Fx1 through Fx4 act on the operation knob 70 as a reaction force of operation in the x-axis direction.

On the basis of the same technical idea, when a reaction force of operation in the y-axis direction is generated, the reaction force control unit 37 controls currents so as to apply a counter-clockwise current to the coil 41 and a clockwise current to the coil 43. By controlling magnitudes of currents applied to the respective coils 41 through 44 from the reaction force control unit 37, the reaction force generation unit 39 adjusts magnitudes of reaction forces of operation in the directions of the respective axes. In addition, directions of a reaction force of operation acting on the combination magnet are switched by changing directions of the currents applied to the respective coils 41 through 44.

In order to generate a predetermined reaction force of operation in the reaction force generation unit 39 as described above, it is necessary for the winding wires 49 of the respective coils 41 through 44 to superimpose on the combination magnet in the z-axis direction for at least a preliminarily determined length. More specifically, in order to generate predetermined electromagnetic forces Fx1 through Fx4 in the x-axis direction, it is necessary for the winding wires 49 of the respective coils 42 and 44 to superimpose on the combination magnet in the portions extending in the y-axis direction for at least a preliminarily determined length. Accordingly, a length of a range superimposing on the combination magnet (hereinafter, referred to as the effective length in the y-axis direction), Ley, in the portion of the winding wires 49 extending in the y-axis direction is preliminarily determined. Likewise, an effective length in the x-axis direction, Lex, is preliminarily determined in order to generate predetermined electromagnetic forces Fy1 through Fy4 in the y-axis direction.

The respective effective lengths Lex and Ley in the directions of the corresponding axes can be maintained even when the combination magnet moves from the reference position due to a movement of the operation knob 70. A configuration of the reaction force generation unit 39 to maintain the respective effective lengths Lex and Ley will be described in the following.

The combination magnet is configured in such a manner that the respective counter surfaces 68 (see FIG. 3) are aligned side by side with every pair of adjacent sides 69 contacting with each other without any clearance in between. The combination magnet is also configured in such a manner that the length Lmx in the x-axis direction between the outer edges is shorter than a length Lcx between outer edges 46a of a set of coils 41 and 43 aligned in the x-axis direction. Further, the combination magnet is configured in such a manner that the length Lmy in the y-axis direction between the outer edges is shorter than a length Lcy in the y-axis direction between outer edges 47a of a set of the coils 42 and 44 aligned in the y-axis direction. Owing to the configuration as above, the combination magnet is held by the operation knob 70 and allowed to move within a range surrounded by the respective outer edges 46a and 47a of the four coils 41 through 44.

Figure 5:
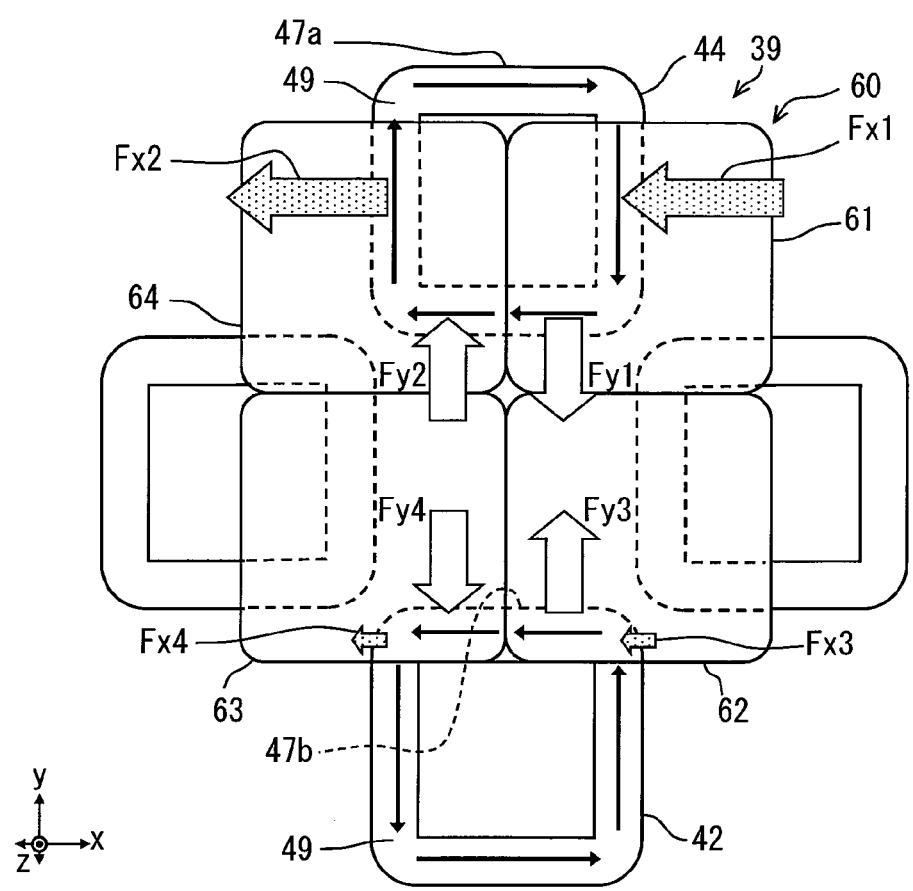
FIG. 5 is a schematic view used to describe a variance in electromagnetic force when a combination magnet is moved in a forward direction in the first embodiment.

A description will now be given to the reaction force generation unit 39 in a case where the combination magnet is moved in the forward direction as shown in FIG. 5. Herein, the counter surfaces 68 of the respective magnets 62 and 63 positioned on the rear side (backward direction) in a moving direction and the coil 42 positioned on the rear side in the moving direction superimpose over a smaller range. The effective length in the y-axis direction, Ley, of the coil 42 is thus reduced. On the contrary, the counter surfaces 68 of the respective magnets 64 and 61 positioned on the front side (forward direction) in the moving direction and the coil 44 positioned on the front side in the moving direction superimpose over a larger range. The effective length in the y-axis direction, Ley, of the coil 44 is thus increased. In the manner as above, a sum of the effective lengths in the y-axis direction, Ley, of the respective coils 42 and 44 is maintained even when the combination magnet moves in the y-axis direction. Hence, the generable electromagnetic forces Fx1 through Fx4 in the x-axis direction can be maintained.

In the present embodiment described above, the combination magnet fixed on the side of the knob base 71 moves relatively with respect to the respective coils 41 through 44 fixed on the side of the housing 50. In a case where a structure contrary to the structure of the present embodiment is adopted by fixing the coils 41 through 44 on the side of the knob base 71 and fixing the combination magnet on the side of the housing 50, a problem as follows occurs. That is, because it becomes necessary to dispose the combination magnet across the entire movable range of the coils 41 through 44, an area of the combination magnet in the x-axis and y-axis directions has to be increased. Hence, a size of the operation device 100 is increased. On the contrary, because the present embodiment adopts the structure to move the combination magnet, a size of the combination magnet can be reduced.

Moreover, it is configured in such a manner that the respective effective lengths Lex and Ley are maintained no matter to which position the combination magnet has moved. Hence, even when the structure to move the combination magnet is adopted, intensities of the generable electromagnetic forces Fy1 through Fy4 and Fx1 through Fx4 can be ensured regardless of the position to which the combination magnet moved. Hence, the operation device 100 that ensures generable electromagnetic forces while reducing sizes of the respective magnets 61 through 64 can be realized.

Contrary to the present embodiment, in a case where the structure to move the coil 41 through 44 is adopted as described above, wires connecting the coils 41 through 44 and the circuit board 52 undergo bending deformation each time the coils 41 through 44 move and durability of the wires becomes a concern. To address such a concern, the present embodiment adopts the structure to move the combination magnet that does not require wires and therefore eliminates bending deformation of the wires occurring when the coils 41 through 44 move. Hence, the concern on the wire durability discussed above can be resolved.

The present embodiment adopts the structure to move the combination magnet as above on one hand, and configured in such a manner that the coil-side yoke 72 is held by the knob base 71 so as to move with the combination magnet on the other hand. Hence, the present embodiment can avoid an inconvenience that a magnetic attraction force acting between the coil-side yoke 72 and the magnets 61 through 64 is exerted over the housing 50 and the knob base 71. In short, an inconvenience that the abutting portions 71c are pressed against the sliding-contact surface 50c by the electromagnetic force can be avoided. Accordingly, the present embodiment can avoid an inconvenience that a large frictional force is generated between the sliding-contact surface 50c and the abutting units 71c when the abutting units 71c in contact with the sliding-contact surface 50c move relatively with respect to the sliding-contact surface 50c. Consequently, the present embodiment can avoid deterioration of the operation feeling when the operator operates the operation knob 70 and therefore can enhance the operation feeling.

In addition, the present embodiment is configured in such a manner that the magnet-side yoke 51 is held by the knob base 71 so as to move with the coil-side yoke 72 and the combination magnet. Hence, because the counter surfaces 51a and 72a of the both yokes 51 and 72, respectively, move pairwise, sizes of the both yokes 51 and 72 can be reduced.

In particular, the present embodiment is configured in such a manner that the mutually opposing counter surfaces 72a and 51a of the coil-side yoke 72 and the magnet-side yoke 51, respectively, are of a same shape and a same size. Hence, sizes of the both yokes 51 and 72 can be further reduced without increasing magnetic lines leaking to the outside of the magnetic circuit.

In the present embodiment, the coil-side yoke 72 and the magenta-side yoke 51 are shaped like a plate expanding parallel to the virtual operation plane OP across which the knob base 71 moves. When configured as above, a magnetic line coming out from the counter surface 51a, which is one of the two counter surfaces 51a and 72a, goes into the other counter surface 72a. Also, a magnetic line coming out from a non-counter surface of the yoke 72 having the other counter surface 72a goes into a non-counter surface of the yoke 51 having the one counter surface 51a. In short, the magnetic circuit is formed for a magnetic line to loop, for example, in order of the counter surface 51a of the magnet-side yoke 51, the counter surface 72a of the coil-side yoke 72, the non-counter surface of the coil-side yoke 72, and the non-counter surface of the magnet-side yoke 51.

In contrast to the present embodiment, when extension portions of a shape extending in the z-axis direction are provided to the both yokes 51 and 72, a magnetic line passing through a space between the non-counter surfaces of the both yokes 51 and 72 passes through the extension portions. Hence, a magnetic line is released to air in the space between the non-counter surfaces and leakage from the magnetic circuit can be restricted. However, a part of the magnetic line passing through a space between the both opposing surfaces 51a and 72a takes a shortcut to the extension portions. A concern is thus raised that density of the magnetic lines passing through the coils 41 through 44 positioned between the both counter surfaces 51a and 72a becomes lower.

To address such a concern, when the extension portions are provided, it is required to dispose the extension portions sufficiently away from the coils 41 through 44 on the x-y plane. However, when the structure to move the both yokes 51 and 72 with the magnets 61 through 64 is adopted, a movable range of the both yokes 51 and 72 on the x-y plane becomes extremely large by disposing the extension portions sufficiently away from the coils 41 through 44.

In view of the foregoing, the both yokes 51 and 72 of the present embodiment are shaped like a plate expanding parallel to the operation plane OP and the extension portions are omitted. Hence, the present embodiment can restrict an increase of the movable range of the both yokes 51 and 72 on the x-y plane in spite of adopting the structure to move the both yokes 51 and 72 with the magnets 61 through 64.

Second Embodiment

Figure 6:
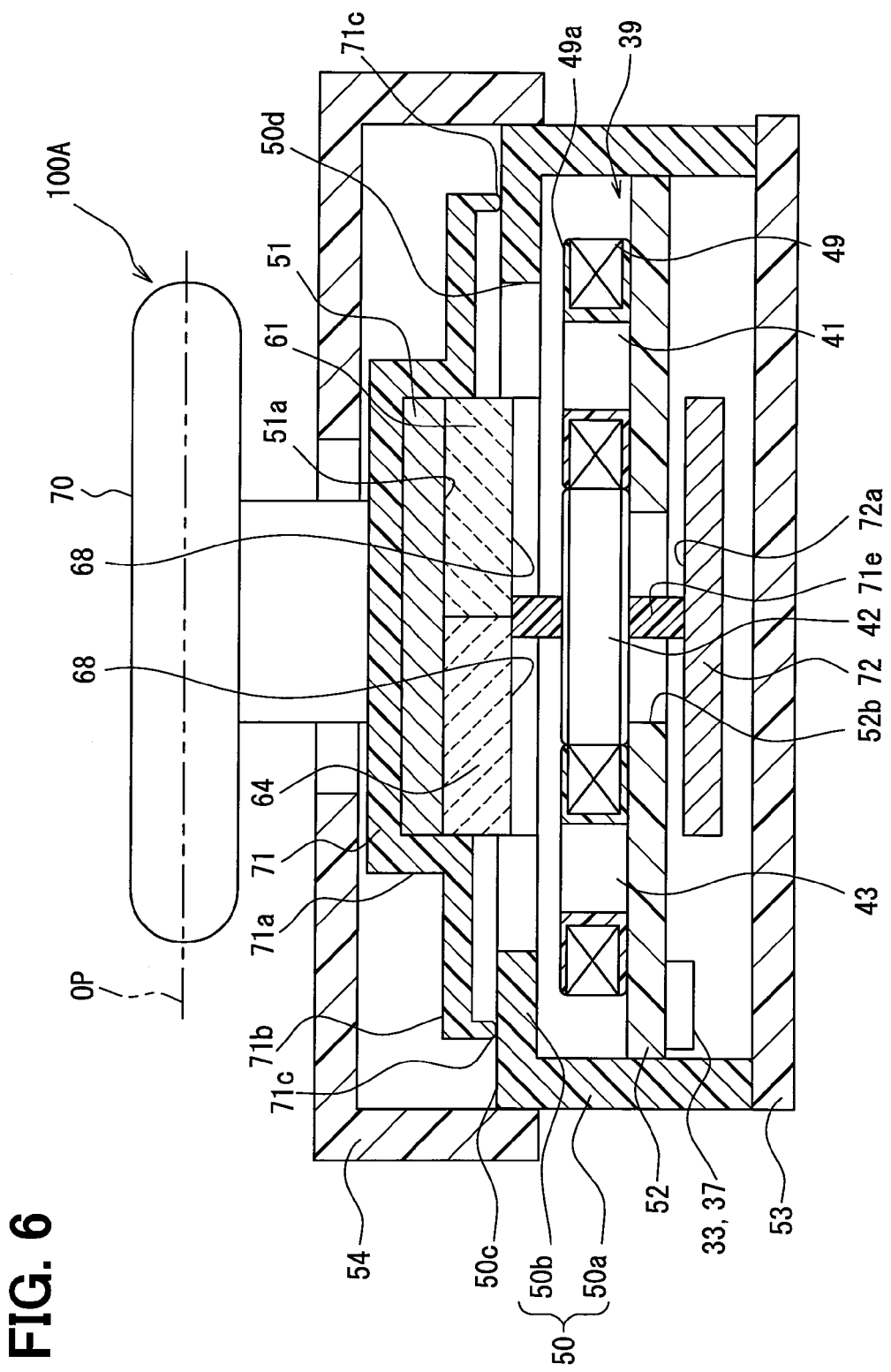
FIG. 6 is a sectional view of an operation device according to a second embodiment of the present disclosure.

In contrast to the operation device 100 of the first embodiment above in which the outer edges of the coil-side yoke 72 is held by the brackets 71d, a center portion of a coil-side yoke 72 is held by a bracket 71e in an operation device 100A of the present embodiment as shown in FIG. 6.

The bracket 71e is positioned at a center of a combination magnet and disposed so as to penetrate through openings 50d and 52b provided to a housing 50 and a circuit board 52, respectively. One end of the bracket 71e is attached to a knob base 71 or magnets 61 through 64 and the other end of the bracket 71e is attached to the coil-side yoke 72.

Other Embodiments

While the preferred embodiments of the disclosure have been described, it should be appreciated that the disclosure is not limited to the embodiments described above and can be implemented in various modifications. For example, the both yokes 51 and 72 are shaped like a flat plate having no irregularities in the first embodiment above. However, an extension portion of a shape extending in the z-axis direction may be provided to at least one of the both yokes 51 and 72. When configured as above, a magnetic line passing through a space between the non-counter surfaces of the both yokes 51 and 72 passes through the extension portion. Hence, a magnetic line leaking to air from a magnetic circuit can be restricted.

In the embodiments above, the operation device 100 has the magnet-side yoke 51. However, as long as the operation device 100 has the coil-side yoke 72, the magnet-side yoke 51 may be omitted.

In the embodiments above, the counter surfaces 51a and 72a of the both yokes 51 and 72, respectively, are formed in a same shape and a same size. However, the counter surfaces 51a and 72a may be different in shape or size or in both.

In the embodiments above, a length of one side of the both yokes 51 and 72 of a rectangular shape is equal to the lengths Lmx and Lmy between the outer edges of the combination magnet. Alternatively, a length of one side of the both yokes 51 and 72 may be different from the lengths Lmx and Lmy between the outer edges. It is, however, preferable to configure in such a manner that the entire combination magnet falls within a projection range of the both yokes 51 and 72 by making a length of one side of the both yokes 51 and 72 longer than the lengths Lmx and Lmy between the outer edges.

In the embodiments above, the operation knob 70 is formed to be movable in each of the x-axis direction and the y-axis direction. Alternatively, the operation knob 70 may be formed to be rotatable about the z-axis direction in addition to the movability in the x-axis direction and the y-axis direction. Even when configured as above, the coil-side yoke 72 has a structure to rotate with the magnets 61 through 64, which eliminates the need to increase an area of the coil-side yoke 72 to cover a rotatable and movable range of the coil-side yoke 72 and the combination magnet. Hence, an advantage of restricting a size increase of the operation device 100 can be achieved when the operation knob 70 is formed rotatable.

In the embodiments above, the respective magnets 61 through 64 are shaped like a square. However, a shape and lengths of the respective sides of each magnet may be changed as needed. For example, the respective magnets may be shaped like an oblong. The respective sides of each magnet may be slightly inclined with respect to an axial direction. Corners of each magnet may be shaped like an arc as in the embodiments above or chamfered. The respective magnets 61 through 64 may be partially cut out in order to avoid interferences with the bracket(s) 71d or 71e, the housing, and so on.

In the embodiments above, the respective magnets 61 through 64 are held by the coil-side yoke 72 with every adjacent pair of the sides 69 of the respective counter surfaces 68 contacting with each other. However, a slight clearance may be provided among the respective aligned magnets.

In the embodiments above, the operation device 100 is mounted to the vehicle in a posture in which a direction of the operation plane OP defined by the operation knob 70 is aligned with the horizontal direction. However, the operation device 100 may be attached to the vehicle center console or the like in a posture in which the operation plane OP is inclined with respect to the horizontal direction.

In the embodiments above, the respective coils 41 through 44 are held by the circuit board 52. The present disclosure, however, is not limited to the holding structure as above and may adopt a structure in which the respective coils 41 through 44 are directly held by the housing 50.

In the embodiments above, functions provided by the operation control unit 33 and the reaction force control unit 37 may be provided by hardware and software different from the above specified portions or a combination thereof. For example, the functions may be provided by an analog circuit that performs a predetermined function without running a program.

The embodiments above have described a case where the present disclosure is applied to an operation device used for an in-vehicle display system. It should be appreciated, however, that an operation device to which is applied the present disclosure is adoptable not only to in-vehicle systems but also to general display systems used for various transportation devices and various information terminals.

In the embodiments above, the respective magnets 61 through 64 are of a square shape when viewed in the z-axis direction. However, the respective magnets 61 through 64 may be of an oblong shape. Also, the combination magnet, which is of a square shape when viewed in the z-axis direction in the embodiments above, may be of an oblong shape.

In the embodiments above, the combination magnet is formed by combining four magnets 61 through 64. Alternatively, magnetic poles same as the magnetic poles of the combination magnet may be provided using a single magnet as described in the following. The single magnet is magnetized to have magnetic poles disposed in the same manner as the magnetic poles provided to the combination magnet formed by combining four magnets 61 through 64.

In the embodiments above, the present disclosure is applied to the operation device 100 that operates the navigation device 20. It should be appreciated, however, that the present disclosure is not limited to an operation of the navigation device 20. For example, the present disclosure may be applied to an operation of an audio device, an air conditioner, or other in-vehicle devices.

In the embodiments above, the operation device 100 is disposed to the center console. The present disclosure, however, is not limited to the configuration above. For example, the present disclosure is applicable to a steering switch provided to a steering wheel, a door, an operation device provided to a back seat or the like. Further, the operation device 100 to which is applied the present disclosure is adoptable not only to in-vehicle operation systems, but also to general operation systems used for various transportation devices and various information terminals.

What is claimed is:

1. An operation device comprising:
   a magnet;
   a coil disposed at a position, through which a magnetic line generated from the magnet passes;
   an operation unit, on which an electromagnetic force functions as a reaction force, the electromagnetic force being generated when an operation force is input and the coil is energized;
   a holding body holding the coil;
   a mobile body in contact with the holding body and movable relatively with respect to the holding body due to the operation force input into the operation unit while holding the magnet so as to provide a predetermined clearance between the coil and the magnet; and
   a coil-side yoke disposed on the coil opposite to the magnet so as to lead the magnetic line generated by the magnet to the coil,
   wherein the coil-side yoke is held by the mobile body so as to be movable with the magnet.

2. The operation device according to claim 1 further comprising:
   a magnet-side yoke disposed on the magnet opposite to the coil so as to provide a magnetic circuit between the coil-side yoke and the magnet-side yoke,
   wherein the magnet-side yoke is held by the mobile body so as to be movable with the magnet and the coil-side yoke.

3. The operation device according to claim 2 wherein:
   surfaces of the coil-side yoke and the magnet-side yoke, which face each other, have a same shape and a same size.

4. The operation device according to claim 2 wherein:
the coil-side yoke and the magnet-side yoke has a plate shape expanding parallel to a virtual operation plane, across which the mobile body is movable.

* * * * *